United States Patent Office 3,018,617
Patented Jan. 30, 1962

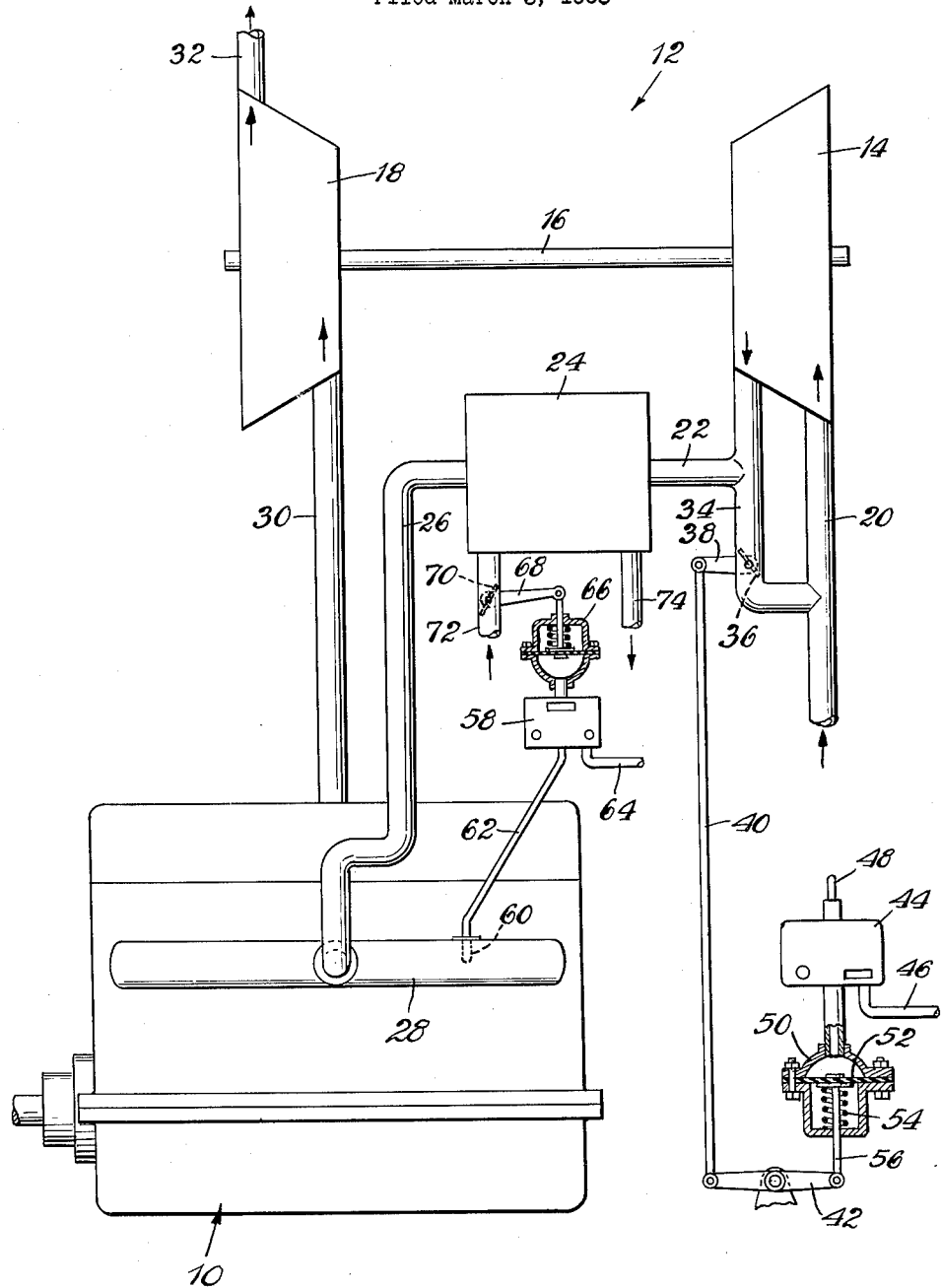

3,018,617
TEMPERATURE RESPONSIVE APPARATUS FOR CONTROLLING TURBOCHARGED ENGINES
Erik Kelgard, Kamloops, British Columbia, Canada, assignor to Nordberg Manufacturing Company, Milwaukee, Wis., a corporation of Wisconsin
Filed Mar. 3, 1958, Ser. No. 718,882
2 Claims. (Cl. 60—13)

This is a continuation-in-part of U.S. application Serial No. 641,295, filed February 20, 1957, now abandoned.

This invention is in the field of internal combustion engines and is concerned with the operation of supercharged intercooled engines.

A primary object of my invention is a supercharged intercooled engine constructed to prevent surging of the supercharger.

Another object is an engine of the above type constructed to prevent supercharger surging at low ambient temperatures.

Another object is an engine of the above type with a control giving maximum supercharger efficiency without surging.

Another object is a method of operating such an engine to maintain approximately constant inlet manifold pressure at lower ambient temperatures.

Another object is an engine control providing a higher engine rating.

Other objects will appear from time to time in the ensuing specification and drawing, which is a schematic or diagrammatic layout of a supercharged intercooled engine with my invention.

In the drawing, the basic elements shown include any suitable type of engine 10, two cycle, four cycle, or otherwise. The engine may be diesel, gas, spark fired, dual fuel, or otherwise. The exact operating characteristics, style, type and design of the engine are unimportant. A turbocharger is shown diagrammatically at 12 with a compressor 14 coupled at 16 in any suitable manner to a turbine 18. The compressor has an inlet duct 20 of any suitable type with an outlet duct 22 supplying relatively high pressure air to a suitable intercooler 24. The cooled compressed air is then supplied by a suitable duct 26 to the engine's inlet manifold 28. The products of combustion from the engine are supplied by an exhaust pipe or manifold 30 to the turbine 18 to drive it and the exhaust gases are vented through a suitable outlet pipe 32. So far, the arrangement is conventional.

Supercharger manufactures design and construct superchargers to handle and supply a certain weight or quantity of air to the engine to satisfy the engine's requirements. Air varies in density according to its temperature. Therefore, in constructing a supercharger, ambient temperatures must be considered, and a supercharger is generally constructed according to a selected ambient temperature, so that at that ambient temperature it will fulfill the engine's requirement. For example, one or more present-day supercharger manufacturers use 68° F. as their standard design or rated ambient temperature. At this temperature, the supercharger will supply the exact weight of air to satisfy the engine. This is only given as an example and a supercharger can be designed for any ambient temperature. Hereinafter, I shall on occasion refer to this as the rated ambient temperature. The important point is that the supercharger is more or less tied to approximately one ambient temperature for proper operation. Any variation from that ambient temperature, and the supercharger will supply a different weight of air and the engine and supercharger will operate inefficiently.

In most climates, the ambient temperature does not vary enough to cause trouble and, therefore, does not warrant consideration. But in extremely cold climates where the temperature may get as low as −10° F. to −20° F., the supercharger, which is otherwise constructed for a much higher temperature, say 68° F., is required to handle quite dense air.

The intercooler, such as at 24, is constructed to cool the high pressure air from the supercharger to an approximately constant manifold temperature, say, for example, 100° F., although this may vary a few degrees either way. In any event, regardless of the outlet temperature from the supercharger, the intercooler withdraws enough heat to bring the temperature of the air supplied to the engine to an approximately constant temperature.

If such an engine is located in a climate where the ambient temperature varies widely, the intercooler will function as a temperature throttle, so to speak. The temperature of the outlet air from the supercharger will vary in relation to the ambient temperature, but regardless of the temperature of the air supplied to the intercooler by the supercharger, the intercooler will always bring the air to an approximately constant temperature before supplying it to the engine.

Therefore, regardless of the ambient temperature, the inlet manifold air will always be at a constant temperature and, of course, its volume is constant. Therefore, the much more dense air supplied by the supercharger to the intercooler resulting from a very low ambient temperature will manifest itself in the inlet manifold as a higher pressure than when the supercharger is operating at its designed or rated ambient temperature, say, 68° F. But, the ambient pressure will be the same, regardless of whether the ambient temperature is high or low, say, 14.7 p.s.i.

From the above, it can be seen that the pressure differential across the supercharger will be higher at the lower ambient temperatures. In effect, the higher pressure in the inlet manifold results from air "backing up" in the inlet side. Eventually, this pressure differential will cause the supercharger to go into surge, causing damage to the supercharger and possibly the engine. Additionally, the compression pressures in the cylinders become excessive at low ambient temperatures.

To take care of the above, I control the supercharger to prevent it from surging. At the same time, I prevent excessive compression pressures. For example, in the drawing a bypass 34 is connected between the supercharger's high side 22 and its low side 20. This return or bypass may be provided with any suitable valve 36. The valve is connected to a lever 38 which may be connected through a suitable linkage 40 and lever 42 to a temperature responsive device. The device shown includes an air operated controller, shown generally at 44, with an air supply line 46. A suitable bulb or thermometer 48 may be mounted on the controller or otherwise so that it will respond to the ambient temperature. The bulb regulates the pressure of the air supplied from the line or source 46 to a chamber 50 which includes a diaphragm 52 dividing the chamber into two compartments. The diaphragm may have a spring 54 to return it to its neutral position and a suitable rod 56 may extend from the diaphragm and be connected to the lever 42.

The important point is that in response to ambient temperatures, the controller varies the pressure of the air on the diaphragm which, through the linkage, will vary the position of the valve 36. The control is constructed so that at the lower ambient temperatures, the valve 36 will be open to bypass air from the supercharger outlet back to its inlet, thereby preventing the manifold pressure from rising.

In the example given above, the control could be arranged to close the valve completely at, say, 68° F., the rated temperature of the supercharger. At ambient temperatures above the rated temperature, the valve would be closed. At lower temperatures, the control could be constructed to open the valve to various positions so that the manifold would be at a constant pressure. On the other hand, the control could be arranged so that the valve would not open until the ambient temperature reached a predetermined low at which point the valve would be opened to various positions at temperatures lower than that point.

I have not shown the details of the controller, and while I have indicated it as a pneumatically operated device, it might be otherwise. For example, the valve might be controlled by a bimetal mechanism. Or any suitable temperature responsive control device could be used to actuate the valve 36. In addition, the details of the valve and its linkage are unimportant. The important point is that the valve is controlled in accordance with ambient temperatures.

Any suitable means could be used to control the intercooler so that the temperature in the inlet manifold would be approximately constant at all times, regardless of the load or the ambient temperature. For example, I have diagrammatically shown a controller 58 which has a temperature sensitive element 60 in the inlet manifold which, through a suitable tube 62, communicates this temperature to the controller. A source of pressure air is indicated at 64 and the controller supplies various amounts of this air to an air motor 66 of any suitable type. The controller and air motor might be the same as indicated at 44 and 50 in connection with the ambient air temperature control. In any event, the air motor, through a suitable lever 68, may control a suitable valve 70 in the inlet line 72 that supplies cooling fluid, normally water, to the intercooler, the cooling fluid outlet line being indicated at 74.

The temperature sensitive element 60 would "feel" the temperature of the inlet air and would maintain it at a constant value by communicating that temperature to the controller at all times which, through the air motor, would control the position of the valve in the cooling water line to the intercooler. While I have shown the valve 70 in the cooling water inlet line, it could be in the outlet pipe. Or it might be any arrangement which would maintain an approximately constant inlet manifold temperature. The particular control shown for the intercooler is only schematic and it might be otherwise. There are a number on the market at the present time and I might use any conventional arrangement.

The supercharger shown has included an exhaust driven turbine and is commonly termed a turbocharger. But the invention may be applied equally well to a crankshaft driven supercharger. In such a case, I might use a bypass around the compressor.

The use, operation, and function of my invention are as follows:

Supercharger surging is a difficult problem in areas that experience relatively low ambient temperatures, such as parts of the United States and Canada. The supercharger manufacturers construct their units to satisfy engine air requirements at a predetermined temperature that is considered the norm. At any ambient temperatures below this, the supercharger will supply a greater weight of air than the engine is designed for. The intercooler functions as a temperature throttle because it is constructed to supply the supercharged air to the engine at a constant temperature, regardless of the temperature of the air being supplied to it by the compressor. Additionally, the intercooler is an approximately constant pressure device. Therefore, at the low ambient temperatures, say, 10° F., the increased density of the air will cause the manifold pressure to rise. Thus, while the supercharger efficiency is increased, nevertheless, eventually the supercharger will go into surge, resulting in a backflow of air through the compressor which, in all probability, will damage the unit.

By a very simple arrangement, such as the bypass pipe shown in the drawing between the supercharger outlet and inlet, I control the unit so that the supercharger will not go into surge. I condition the air supplying apparatus for the engine so that regardless of how low the ambient temperature is, the engine may receive air at an approximately constant temperature and pressure. Therefore, the engine will be unaffected by ambient conditions.

It is important to note that the closer the supercharger gets to its surge condition, the more efficient it operates. Therefore, by my simple procedure, I can bring the efficiency of the supercharger as close to its surging condition as I please without actually throwing it into surge. Additionally, the control mechanism can be set so that while the supercharger is quite close to its surge condition, nevertheless, the accurate control will prevent it from ever going into surge. In short, I can operate the supercharger at a very high efficiency without any danger of surging.

Also, I have shown and stated that the control valve in each case is automatically operated, and this, of course, is preferred; however, the valve could quite easily be manually set in accordance with ambient temperatures, even though this might be considered to place an unnecessary burden on the operator.

While I have shown what I shall refer to as a cold bypass around the compressor of the supercharger, meaning that it handles relatively cool air, as compared to the temperature of the exhaust gases, nevertheless, other arrangements might be used. But I prefer to use a cold bypass between the compressor outlet and the inlet so that the supercharger compressor will be handling the same quantity of air but the pressure in the inlet manifold will drop. While I have shown the pipe 34 returning to the inlet 20 to the compressor, it might merely be vented to the atmosphere or to the exhaust 32 on the compressor or otherwise disposed of. But for clarity I have not shown such arrangement. I prefer the arrangement shown in the drawings so that the supercharger compressor will be handling the same quantity of air and the pressure in the inlet manifold will drop when on the dual fuel cycle.

While I have shown and suggested various forms of my invention, it should be understood that suitable additional modifications, changes, and alterations may be made without departing from the invention's fundamental theme. I, therefore, wish that the invention be unrestricted except as by the appended claims.

I claim:

1. An internal combustion engine having a supercharger with a compressor and a turbine, the compressor being connected to the engine so as to supply relatively high pressure air for combustion, the turbine being connected to the engine so as to receive exhaust gases from the engine to drive the turbine, the turbine being connected to the compressor to drive it, the supercharger being constructed and arranged to supply the proper weight of air for the most efficient engine operation at a predetermined rated ambient temperature, an intercooler between the compressor and the engine constructed to cool the inlet air supplied by the compressor to an approximately constant temperature regardless of ambient temperature, and means responsive to ambient temperatures below the rated temperature of the supercharger for varying the volume of air supplied by the compressor to maintain the inlet pressure of the air supplied to the engine approximately constant at ambient temperatures below the predetermined rated temperature of the supercharger.

2. The structure of claim 1 further characterized in that said last mentioned means includes a bypass connected from the compressor's outlet to its inlet for returning air to the inlet, a valve in the bypass, and means responsive to ambient temperature for operating the valve so that the volume of air returned from the compressor's outlet to its inlet will vary in inverse relation to ambient temperature below the predetermined ambient temperature so that at the lower ambient temperatures larger volumes of air will be returned and at the higher ambient temperatures smaller volumes of air will be returned.

References Cited in the file of this patent

UNITED STATES PATENTS

| | | |
|---|---|---|
| 1,281,216 | Schellens | Oct. 8, 1918 |
| 1,371,444 | Sherbondy | Mar. 15, 1921 |
| 2,253,406 | Wagner | Aug. 19, 1941 |
| 2,559,623 | Holmes | July 10, 1951 |
| 2,581,334 | Reggio | Jan. 1, 1952 |
| 2,636,341 | Buchi | Apr. 28, 1953 |
| 2,696,345 | Hopper | Dec. 7, 1954 |
| 2,705,590 | Lovesay et al. | Apr. 5, 1955 |